Aug. 9, 1960   P. W. CUMMINGS, JR   2,948,581
METHOD OF PRODUCING A SYNTHETIC FIBER
Filed Dec. 20, 1955
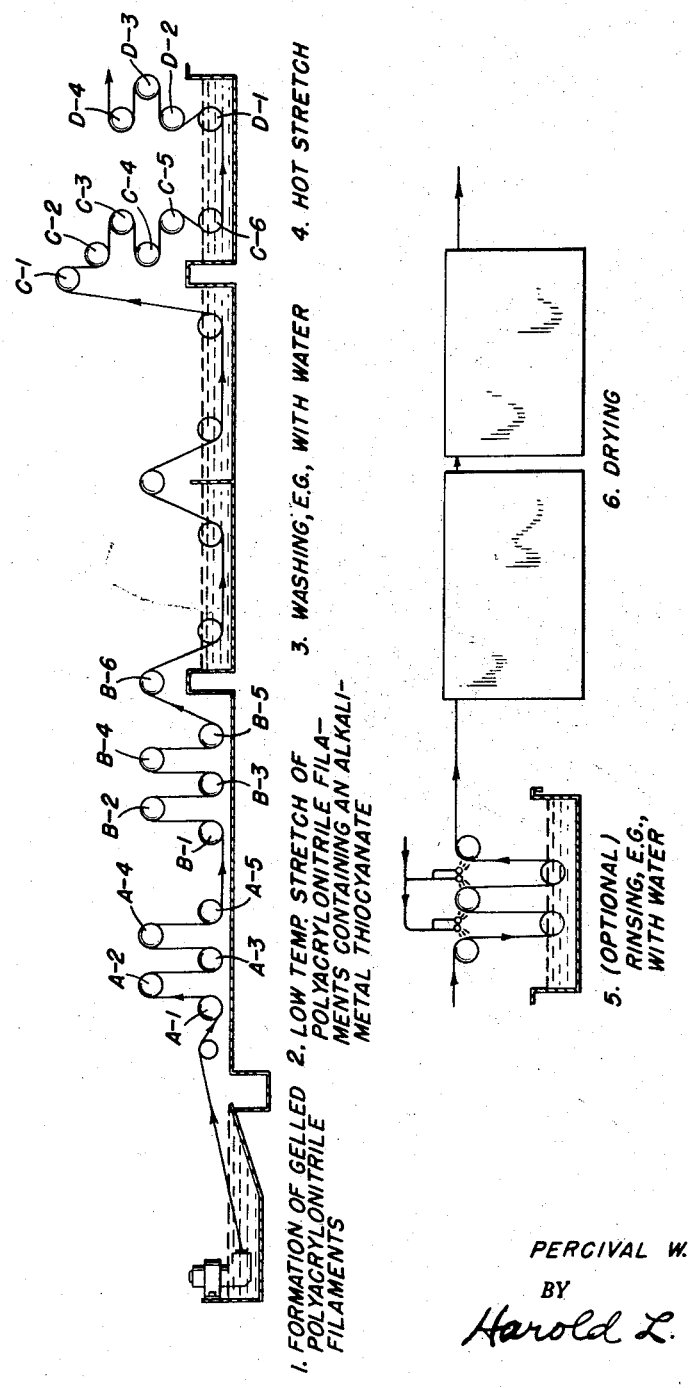
INVENTOR.
PERCIVAL W. CUMMINGS, JR
BY
Harold L. Kauffman
ATTORNEY.

United States Patent Office 2,948,581
Patented Aug. 9, 1960

2,948,581

METHOD OF PRODUCING A SYNTHETIC FIBER

Percival W. Cummings, Jr., Cos Cob, Conn., assignor to American Cyanamid Company, New York, N.Y., a corporation of Maine Filed Dec. 20, 1955, Ser. No. 554,155

10 Claims. (Cl. 18—54)

This invention relates to certain new and useful improvements in the production of synthetic fibers and, more particularly, is concerned with an improved method of producing a polyacrylonitrile filamentary material.

Various methods of producing filaments, films and other shaped articles from polyacrylonitrile (polymeric acrylonitrile) and from copolymers or interpolymers of a major proportion of acrylonitrile and a minor proportion of another monomer or monomers heretofore have been suggested. For example, in Rein U.S. Patent No. 2,117,210, dated May 10, 1938, it is proposed that polyacrylonitrile be dissolved in a quaternary ammonium compound, more particularly, a pyridinium compound such as benzyl pyridinium chloride, and that the resulting solution be employed in making films, threads and other shaped bodies therefrom. Also, in Rein U.S. Patent No. 2,140,921, dated December 20, 1938, it is proposed that various polyvinyl compounds including polyacrylonitrile and copolymers of acrylonitrile with another vinyl compound be dissolved in concentrated aqueous solutions of inorganic (metal) salts, e.g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in Latham U.S. Patent 2,404,714; Rogers U.S. Patents 2,404,715 and -725; Hanseley U.S. Patent 2,404,-716; Houtz U.S. Patents 2,404,713-722, -724 and -727; Merner U.S. Patent 2,404,723; Charch U.S. Patent 2,404,726; and Finzel U.S. Patent 2,404,728, all dated July 23, 1946, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

Another method of producing filaments and other shaped products from polymers and copolymers of acrylonitrile is disclosed and claimed in Cresswell U.S. Patent No. 2,558,730, dated July 3, 1951. The invention disclosed and claimed in that patent is based on the discovery that useful films, filaments, threads and other shaped articles can be produced from acrylonitrile polymerization products of the kind described therein and in the aforementioned patents, as well as hereinafter, by precipitating or coagulating the polymerization product in approximately its desired shape from a water-coagulable solution thereof, more particularly, a concentrated aqueous salt solution of the kind disclosed by Rein in his Patent No. 2,140,921, the precipitation being effected by contacting the said solution with a cold aqueous coagulant, more particularly water alone, at a temperature not substantially exceeding +10° C. This coagulant is a non-solvent for the polymerization product but will dissolve the solvent in which the said product is dissolved. Surprisingly, it was found that by keeping the temperature of the aqueous coagulating bath at or below +10° C., e.g., within the range of −15° C. to +10° C.

and preferably at from about −15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product.

Still other methods of producing filamentary material from a polymer of acrylonitrile are known. For example, British Patent No. 714,530 describes a method wherein a thread is formed from a spinning solution containing a polyacrylonitrile and, as a solvent therefor, a mixture consisting essentially of water, one or more water-miscible, aliphatic liquids containing an alcoholic hydroxyl group and not more than 6 carbon atoms in the molecule, and one or more highly water-soluble salts of a particular class which includes the alkali-metal thiocyanates. In another process of producing threads from a polymer of acrylonitrile (British Patent No. 732,135), a solution of the polyacrylonitrile in a concentrated aqueous solution of a water-soluble salt that yields highly hydrated ions in an aqueous solution is extruded into an aqueous coagulating bath in which is dissolved at least 5% by weight of the same water-soluble salt used as a solvent for the polymer, the coagulating bath also containing a water-miscible alcohol.

Although processes such as are described briefly above and more fully in the aforementioned patents are satisfactory in forming useful filamentary materials from homopolymeric and many different copolymeric acrylonitriles, there are some instances where the acrylonitrile polymer is not readily amenable to the processing steps described in the prior art patents mentioned above. For example, with certain copolymers of acrylonitrile the yarn has poor stretch charateceristics when orientation of the molecules along the fiber axis is effected by stretching the yarn a single time, and, if stretchable, yields a yarn having low tenacity values and other inferior properties.

The present invention is based on my discovery that the properties, e.g., dry and wet tenacities, of a polyacrylonitrile filamentary material can be improved by first applying to the gelled, polyacrylonitrile filamentary material a so-called "cold solvent stretch" to a particular extent while the gelled material contains water and also a critical amount of an alkali-metal thiocyanate; treating, e.g., washing, the thusly stretched filamentary material for the removal of thiocyanate therefrom; and then "hot-stretching" the treated filamentary material a second time to a particular extent under particular conditions. By this process a greater total stretch can be applied to a polyacrylonitrile gelled yarn than can be applied in a single hot stretch alone. Also, spinning solutions containing certain acrylonitrile copolymers that yield gelled filaments which break at low stretches in a hot stretch bath are amenable to use in the process of my invention, and can be made into useful articles by first applying a moderate cold stretch to the gelled filaments, washing or otherwise removing the thiocyanate, and finally applying a hot stretch.

The process of the present invention also has certain other advantages. For instance, it facilitates subsequent processing operations, e.g., washing, in that the thiocyanate diffuses more rapidly from the smaller-diameter, once-stretched filaments.

The novel features which are characteristic of my invention are set forth in the appended claims. The invention iself, however, will best be understood by reference to the following more detailed description when considered in connection with the accompanying drawing in which the single figure shows somewhat schematically the several steps involved in the method of the invention and indicative of apparatus that can be use in practicing the method.

Referring to the drawing, it is there indicated that the first step is the formation of a gelled, polyacrylonitrile filamentary material. Any suitable method may be used in preparing the gelled filaments but a preferred method involves dissolving an acrylonitrile polymer, that is, a homopolymer or copolymer of acrylonitrile, in a concentrated aqueous solution of an alkali-metal thiocyanate (e.g., sodium thiocyanate, potassium thiocyanate, lithium thiocyanate, etc.) to form a spinning solution. The concentration of the alkali-metal thiocyanate in the water in all cases is sufficiently high so that the resulting solution will dissolve the acrylonitrile polymer. In most cases the concentration of thiocyanate is substantially above 40% (e.g., from 45–50% to 55–60%) of the total weight of the solution of thiocyanate dissolved in water, the upper limit being a saturated solution of the thiocyanate in water.

In forming the gelled, polyacrylonitrile filaments, an alkali-metal thiocyanate solution of an acrylonitrile polymer of the kind described above, after filtration and de-aeration, is passed under pressure to an extrusion head and thence through the openings or orifices in a spinnerette into a liquid coagulating bath comprising an aqueous solution containing from about 5% to about 20%, by weight, of an alkali-metal thiocyanate. From a practical standpoint and to simplify the recovery problem, it is desirable that the thiocyanate employed in producing the liquid coagulating bath be of the same kind as that used in forming the concentrated aqueous solution in which the acrylonitrile polymerization product is dissolved.

As the spinning solution is forced under pressure through the openings in the spinnerette it coagulates or precipitates in the form of gelled filaments upon entering the coagulating bath. In the preferred embodiment of the invention, the coagulating bath is maintained at a temperature not exceeding +10° C. by any suitable means and preferably is maintained at or below 0° C., e.g., at −9° C. to −0.5° C. By using such a coagulating bath, coagulation takes place somewhat more gradually than when cold water alone is used as the liquid coagulant, other conditions being the same, thereby minimizing or obviating the formation of a dense skin on the surface of the individual filaments upon subsequent drying, with obvious disadvantages from the standpoint of ease of drying, greater amenability to dyeing, etc.

If desired, a water-miscible alcohol also may be incorporated into the coagulating bath along with the alkali-metal thiocyanate as is described more fully in, for instance, British Patent Nos. 732,135 and 738,759. Such alcohols include methyl, ethyl, propyl, isopropyl, n-butyl, sec.-butyl and tert.-butyl alcohols, which constitute a preferred class because of their relatively low boiling points; although one can also use the higher monohydric alcohols as well as the various polyhydric alcohols (e.g., dihydric, trihydric, etc.), these are less desirable from an economic and operating standpoint. The alcohol, if employed, generally constitutes at least 4%, e.g., from 5% to 15%, by weight of the bath.

Instead of, or in addition to, the modification which comprises incorporating an alcohol in the coagulating bath, one can also add an alcohol to the spinning solution as is described more fully in, for instance, British Patent No. 714,530.

When alcohol is a component of the spinning solution, or the coagulating bath, or both, the bath temperature may range, for instance, from −15° C. to +10° C., as in the aforementioned U.S. Patent No. 2,558,730, or at higher temperatures ranging, for example, up to 40° C. The gelled, polyacrylonitrile filamentary material obtained under these conditions is a hydrogel-alcogel product, that is, it contains both water and alcohol in the gel structure in addition to the alkali-metal thiocyanate and the polyacrylonitrile.

In praticing the present invention, the concentration of the alkali-metal thiocyanate in the spinning solution and in the coagulating bath, the length of travel of the gelled, filamentary material through the coagulating bath and the other spinning operations are all so correlated that the amount of residual thiocyanate in the gelled, filamentary material after leaving the coagulating bath and before washing (or otherwise treating to remove thiocyanate) is, on a net-dry basis, from one-half to twice the weight of the net-dry acrylonitrile polymer contained in the gelled, polyacrylonitrile filamentary material. This concentration of the alkali-metal thiocyanate in the gelled, filamentary material is an important and critical aspect of the present invention.

Referring again to the drawing, it will be noted that the gelled, polyacrylonitrile filaments are led from the coagulating bath over a series of rolls, which are designated in the drawing as A–1, A–2, A–3, A–4, A–5, B–1, B–2, B–3, B–4, B–5 and B–6. Each of the rolls of the A–1 to A–5 series revolves at approximately the same peripheral speed. The rolls of the B–1 to B–6 series may be operated in either of two different ways: all of the rolls of the series B–1 to B–6, inclusive, can be operated at peripheral speeds so in excess of the peripheral speeds of the A–1 to A–5 series that the desired stretch is imparted to the gelled, polyacrylonitrile filamentary material; or, in some cases, it may be desirable to operate rolls B–1, B–2 and B–3 at a higher peripheral speed than the rolls of the A–1 to A–5 series in order to impart the desired stretch to the polyacrylonitrile filaments; while rolls B–4, B–5 and B–6 are operated at a lower peripheral speed than rolls B–1, B–2 and B–3 but at a higher peripheral speed than the rolls of the A–1 to A–5 series, so that there is no tension on the gelled, polyacrylonitrile filaments as they pass onto the next step of the process, e.g., washing. In this way, washing of the filaments can be effected while they are in a relaxed and loose state, permitting easier penetration of the washing medium and more rapid extraction of the thiocyanate.

In this first stretching step the gelled, polyacrylonitrile filamentary material is stretched at a temperature of from about −2° C. to about 40° C. to between one and one-half and four times its original length. The stretching is preferably effected while the thiocyanate-containing, gelled, filamentary material is in an inert, gaseous medium, e.g., air, nitrogen, carbon dioxide or mixtures of air with other inert, gaseous media. In some cases, however, it may be desirable or advantageous to carry out this first stretch while the gelled, filamentary material is in contact with (e.g., immersed in) some other medium that will not extract the alkali-metal thiocyanate from the gelled material, for example, an aqueous solution of the same alkali-metal thiocyanate used in the coagulating bath and the concentration of which is such as is required to maintain the thiocyanate content of the gelled material within the range specified hereinbefore and set forth in the appended claims.

After being stretched as above described, the initially stretched, gelled, filamentary material is then treated for the removal of thiocyanate. Such a treatment may take various forms, e.g., washing, which is the form shown in step 3 of the process illustrated in the drawing. The rolls over which the filaments pass during the washing step may all operate at the same peripheral speed or with each or some at a peripheral speed slightly lower than the one immediately preceding it in the series. Washing may be done with water alone at normal (e.g., 15°–30° C.) or at an elevated temperature (e.g., 35°–50° C.), or even at a reduced temperature (e.g., 1° C. up to 15° C.); or, if desired, one could use mixtures of water and an alcohol (e.g., ethanol), or other solvents. The washing means are not limited to the use of troughs as shown in the drawing or to the number which is there shown. A series of countercurrent wash troughs or vessels can be used, or any other suitable washing devices.

From the washing step the washed, gelled, filamentary material is then led over a series of rolls C-1 to C-6 and D-1 to D-4. The rolls of the series C-1 to C-6 are each operated at approximately the same peripheral speed while the rolls of D-1 to D-4 are each operated at a peripheral speed higher than the peripheral speeds of the rolls of the C-1 to C-6 series so that the desired further stretch is imparted to the gelled, polyacrylonitrile filamentary material. In this second stretching operation, the washed, filamentary material (or filamentary material which has been otherwise treated for the removal of thiocyanate) is stretched to between one and one-half and ten times its once-stretched length, the second stretch being correlated with the first stretch so that the total stretch is to from three to fifteen times the length of the said filamentary material immediately before the first stretch. This second stretch is effected while the gelled, filamentary material is in contact with moisture and at a temperature within the range of about 70° C. to about 110° C., preferably while it is in contact with water at a temperature of about 70° C. to about 100° C. When temperatures above 100° C. are to be employed, the meduim may be steam or hot water under superatmospheric pressure. Good results are obtained when the aqueous fluid medium in which the gelled, filamentary material is stretched in water within the range of about 90° C. to about 100° C.

After this second stretching operation the gelled, filamentary material may be rinsed, e.g., with water, as indicated in step 5 of the process illustrated in the drawing. Such a rinsing operation, however, is optional and may be omitted.

Following the rinsing step (if applied to the gelled material), the gelled filaments are dried as indicated in step 6 of the process illustrated in the drawing. Such a drying step may be effected by passing the stretched filaments through an apron-type of dryer wherein the filaments are dried under suitable conditions of temperature and humidity. In the case of the production of polyacrylonitrile tow, the dried material may be crimped and further processed to yield a product which is sold as tow; or, after crimping, it may be cut to staple lengths and further processed to yield staple fibers which are baled and sold as such.

In order that those skilled in the art better may understand how the present invention can be carried into effect, the following examples are given by way of illustration and not by way of limitation. All parts and percentages are by weight.

EXAMPLE 1

A. A copolymer comprised of about 95% acrylonitrile and 5% methyl acrylate and having an average molecular weight of about 60,000 is dissolved in a concentrated aqueous solution of sodium thiocyanate to yield a spinning solution or "dope" containing about 12.5% of the aforesaid copolymer, about 43.75% sodium thiocyanate and about 43.75% water. After deareation and filtration, this dope is heated to 98° C. and extruded through a 40-hole spinnerette of 90-micron hole diameter into a coagulating bath comprised of about 10% aqueous sodium thiocyanate at about −2° C.

The gelled, filamentary material passes from the spinnerette face through the coagulating bath for a distance of 3½ inches, and is removed from the coagulating bath at 6.5 meters per minute by means of a pair of converging "pull-away" rolls over which the thread moves in a helical path from the feed-on end to the take-off end. The gelled thread or fiber, which contains sodium thiocyanate in an amount corresponding to about 1.1 times the net-dry weight of the acrylonitrile-methyl acrylate copolymer therein, is continuously removed from these rolls by a second pair of converging rolls at the rate of 23.6 meters per minute. The gelled, filamentary material is at a temperature (average temperature) of about 5° C. during its passage from the first set of converging rolls through an inert gaseous medium, specifically air, to the second set of rolls, which, as has been indicated, are operated at a higher peripheral speed than the first set. The gelled fiber receives in this way a first stretch ("solvent" stretch), which may be described as a 3.63 "roll-ratio" stretch; or, otherwise stated, the filamentary material is stretched to 3.63 times its original length (2.63-fold stretch plus the original length of 1 unit).

The once-stretched, gelled filaments are water-washed on the second pair of converging rolls to remove substantially all of the sodium thiocyanate; and from the take-off end of these rolls the thread passes to a third pair of converging drying rolls running at a peripheral speed of 70.5 meters per minute. In passing between the second and third pair of rolls, the filamentary material is hot-stretched by being led through a trough of water held at about 90° C. This second stretch is a 3.00 roll-ratio stretch, that is, the thread is stretched to three times the length of the continuous filamentary material after the first stretch and to 10.89 times its original lenth, that is, before stretching for the first time. The twice-stretched, gelled filaments are dried on this third set of rolls, and physical tests are made on the dried, oriented continuous-filament yarn.

B. Same as the procedure described under "A" with the exception that the second or wash rolls are operated at the same peripheral speed as the first or pull-away rolls, so that the same total stretch is applied to the gelled filaments but no first or solvent stretch; instead, only the hot-stretch. The results of physical tests on the dried yarn are given in Table 1 in comparison with the yarn of "A."

Table 1

| Yarn | Tensile Strength in Gms./Denier | | | | Elongation, percent | | | |
|---|---|---|---|---|---|---|---|---|
| | Dry | Wet | Knot | Loop | Dry | Wet | Knot | Loop |
| 1-A (solvent stretch + hot stretch). | 3.7 | 3.1 | 2.2 | 2.8 | 23.0 | 20.5 | 14.0 | 17.5 |
| 1-B (hot stretch only). | 3.2 | 2.6 | 1.9 | 2.2 | 24.0 | 22.0 | 15.0 | 17.0 |

EXAMPLE 2

A copolymer comprised of about 90% acrylonitrile and about 10% ethyl methacrylate and having an average molecular weight of about 74,000 is dissolved as in A of Example 1 to give a spinning dope containing about 9.6% of copolymer solids, while approximately equal parts by weight of sodium thiocyanate and of water constitute the remainder. When an attempt is made to spin this dope as in B of Example 1 (that is, using a hot stretch only), it is found impossible to do so, no matter what amount of stretch is applied, because of filament breakage in the hot-stretch trough.

A yarn is successfully spun from this spinning dope following the general procedure described under A of Example 1. The gelled thread, at the take-off end of the first or pull-away rolls, contains sodium thiocyanate in an amount corresponding to about 1:4 times the net-dry weight of the acrylonitrile-ethyl methacrylate copolymer. Between the first and second set of rolls it is stretched to 2.6 times its original length while at an average temperature of about 5° C. After washing, it is hot-stretched to three times its length after the first stretch, so that the toal or overall stretch is to 7.8 times its original length. Physical properties on the dried yarn are given in Table 2.

Table 2

| Tensile Strength in Grams per Denier | | | |
|---|---|---|---|
| Dry | Wet | Knot | Loop |
| 2.5 | 2.3 | 1.8 | 2.0 |

EXAMPLE 3

A. A copolymer comprised of about 95% acrylonitrile and about 5% acrylamide and having an average molecular weight of about 72,500 is dissolved as in A of Example 1 to yield a spinning dope containing about 10% of copolymer solids, about 45% sodium thiocyanate and about 45% water. This spinning solution is spun into continuous filaments in essentially the same manner described under A and B of Example 1 with these differences: The maximum pull-away speed is about 10.1 meters per minute. The gelled thread, at the take-off end of the first or pull-away rolls, contains sodium thiocyanate in an amount corresponding to about 1.2 times the net-dry weight of the acrylonitrile-acrylamide copolymer present therein; the solvent stretch (first stretch) is to 3.85 times the original length while the hot stretch is to 3.28 times the length after the first stretch, giving a total or overall stretch to about 12.6 times the original length. The dried yarn is identified as "3–A" in Table 3, wherein are given the results of physical tests thereon.

B. Same as in A of this example with the exception that only the hot stretch is applied, the degree of which is such as to give the same total stretch as in A. The properties of the dried yarn are given in Table 3, wherein it is identified as 3-B.

EXAMPLE 4

A. A copolymer comprised of about 90% acrylonitrile about 10% hydroxyethyl methacrylate and having an average molecular weight of about 74,000 is dissolved as in A of Example 1 to yield a spinning dope containing about 9% of copolymer solids, and about 45.5% each of sodium thiocyanate and of water. This spinning solution is spun into continuous filaments as described under A and B of Example 1 with these differences: The maximum pull-away speed is about 12.3 meters per minute. The gelled thread, at the take-off end of the first rolls, contains sodium thiocyanate in an amount which is about 1.5 times the net-dry weight of the acrylonitrile-hydroxyethyl methacrylate copolymer present therein; the solvent stretch (first stretch) is to 3.92 times the original length while the hot stretch is to 3.3 times the length after the first stretch, giving a total stretch to about 12.94 times the original length. The dried yarn is identified as "4–A" in Table 3, wherein are given the results of physical tests thereon.

B. Same as in A of this example with the exception that only the hot stretch is applied, the degree of which is such as to give the same total stretch as in A. The properties of the dried yarn are given in Table 3, wherein it is identified as 4-B.

Table 3

| Yarn | Tensile Strength in Gms./Denier | | | | Elongation, Percent | | | |
|---|---|---|---|---|---|---|---|---|
| | Dry | Wet | Knot | Loop | Dry | Wet | Knot | Loop |
| 3-A (solvent stretch+hot stretch) | 4.2 | 3.9 | 2.6 | 3.2 | 23.5 | 26.0 | 14.5 | 18.5 |
| 3-B (hot stretch only) | 3.5 | 3.4 | 2.2 | 2.7 | 21.5 | 25.0 | 14.5 | 17.0 |
| 4-A (solvent stretch+hot stretch) | 4.0 | 3.7 | 2.0 | 2.6 | 24.0 | 25.5 | 13.5 | 16.5 |
| 4-B (hot stretch only) | 2.9 | 2.6 | 1.6 | 2.0 | 26.5 | 28.0 | 15.5 | 19.0 |

Among other acrylonitrile copolymers that have been spun into fibers in a manner corresponding generally to that described in the foregoing examples, and with comparable improvements in processing and in properties of the products, may be mentioned the following:

Copolymer of:
    (a) 85% acrylonitrile and 15% methyl acrylate
    (b) 90% acrylonitrile and 10% methyl acrylate
    (c) 92.5% acrylonitrile and 7.5% methyl acrylate
    (d) 90% acrylonitrile and 10% vinyl acetate
    (e) 90% acrylonitrile and 10% ethyl acrylate
    (f) 90% acrylonitrile and 10% methyl methacrylate In spinning the dopes containing these copolymers, maximum pull-away speeds varied between 9.7 and 17.3 meters per minute. The thread is solvent-stretched to between 3.45 and 4.0 times the original length, and total stretched to between 9.75 and 12.35 times the original length.

Corresponding improvements also are obtained when one similarly processes a spinning dope containing about 9.8% homopolymeric acrylonitrile (average molecular weight about 74,500), and the remainder being constituted of about equal parts by weight of sodium thiocyanate and of water. The dope at 85° C. is extruded through a 45-hole spinnerette of 75-micron hole diameter into a 13% sodium thiocyanate aqueous coagulating bath at about 0° C. The dope is spun at a setting to give 75 total denier. The yarn is solvent-stretched to 3.25 times its original length and hot-stretched in hot water to give a total stretch to 8.85 times its original length.

EXAMPLE 5

A tow of filamentary material is produced from a copolymer of acrylonitrile following the general procedure hereinbefore described with reference to the accompanying drawing. In producing this tow a copolymer of about 90% acrylonitrile and about 5% each of 2-methyl-5-vinylpyridine and vinyl acetate is dissolved in a concentrated aqueous solution of sodium thiocyanate in proportions such as will yield a spinning solution containing about 10% of the ternary polymer. After deaeration and filtration, the solution is heated to a temperature of about 85° C. and extruded through a multi-hole spinnerette into an aqueous coagulating bath containing about 10% of solium thiocyanate and maintained at a temperature of about −10° C. The gelled tow of polyacrylonitrile filaments is led from the coagulating bath over a series of rolls corresponding to those shown in the drawing. Rolls A–1 to A–5 are operated at a peripheral speed of approximately 12.5 meters per minute while rolls B–1 to B–6 are operated in one run at a peripheral speed of about 25 meters per minute. In this way the tow of filamentary material is stretched to twice its original length. During stretching the tow contains sodium thiocyanate in an amount corresponding to about 1.1 times the amount of ternary polymer which is present in the galled filaments and is at an average temperature of about 10° C.

As has been indicated hereinbefore, rolls B–4 to B–6 can be operated at a lower peripheral speed than rolls B–1 to B–3 so that there is no tension on the gelled tow as it passes onto the next step of the process. Illustrative of such a mode of operation is the procedure employed in a second and different run wherein rolls B–1 to B–3 are operated at a peripheral speed of 28.5 meters per minute while rolls B–4 to B–6 are operated at a peripheral speed of 25 meters per minute. As a result, the tow is in a loose and relaxed state during the subsequent washing step.

From roll B–6 the once-stretched, filamentary material passes through a series of washing troughs or tanks wherein substantially all of the sodium thiocyanate is washed from the filaments by immersion in water maintained at a temperature of about 20°–30° C. It is then led over rolls C–1 to C–6 through a bath of hot water maintained at an average temperature of about 95° C. and thence over rolls D-1 to D-4. The rolls of the C-1 to C-6 series are operated at a peripheral speed of about 25 meters per minute while the rolls of the D-1 to D-4 series are operated at a peripheral speed of about 100 meters per minute. In this way the gelled filamentary material is stretched to four times its length after the first stretch; and for both runs the total stretch is to eight times the original length of the tow before the first stretch.

If desired, the twice-stretched tow may be rinsed with water as indicated in step 5 of the drawing, after which it is dried under conventional drying conditions of temperature and humidity in any suitable type of drying apparatus.

Instead of all or part of the vinyl acetate in the above formulation one can substitute, for example, methyl acrylate, acrylamide, methacrylonitrile, monoallyl amine, monomethallyl amine, N-methyl allyl amine, N,N-dimethyl allyl amine or various other ethylenically unsaturated monomers, numerous examples of which are given hereinafter.

It will be understood, of course, by those skilled in the art that my invention is not limited to the detailed procedures or to the use of the particular acrylonitrile polymers, spinning dopes, coagulating baths, etc., that are given by way of illustration in the foregoing examples. For instance, instead of sodium thiocyanate one can use potassium thiocyanate or any of the other alkali-metal thiocyanates in producing either the spinning dope or the coagulating bath or both. Calcium thiocyanate and the other thiocyanates are not the equivalent of the alkali-metal thiocyanates in practicing the present invention. As disclosed hereinbefore, various alcohols can, however, be added to the spinning dope or to the coagulating bath or to both.

Likewise, it will be understood by those skilled in the art that the temperature (average temperature) of the gelled, polyacrylonitrile filamentary material during the first stretching step may be varied considerably from that employed in the individual illustrative examples. Thus, this temperature can range from about −2° C. to about +40° C., but generally it is within the range of from about +5° C. to about +30° C. Preferably, the amount of residual thiocyanate in the gelled, polyacrylonitrile filamentary material after leaving the coagulating bath and before washing is, on a net-dry basis, from about 1 to about 1.5 times, by weight, that of the net-dry acrylonitrile polymer contained in the said gelled, filamentary material. Also, the thiocyanate-containing, gelled filamentary material is preferably stretched initially to between 1½ and 3 times its original length in an inert atmosphere comprising air; and, after washing to remove thiocyanate, it is stretched a second time, while hot, as hereinbefore described, under conditions that are correlated with the first stretch so that the total stretch is preferably to from about four to about nine times the original length of the filamentary material, that is, its length immediately before the first stretch.

The acrylonitrile polymers from which the polyacrylonitrile filamentary material (i.e., continuous-filament yarns, tow and staple fibers) are made include fiber-forming (fiber-formable) homopolymeric acrylonitrile and fiber-forming (fiber-formable) acrylonitrile copolymers (thermoplastic acrylonitrile copolymers) containing in the polymer molecules an average of, for example, at least about 35%, advantageously at least about 50% and preferably at least about 75%, by weight of combined acrylonitrile. Taking as an example the expression "an acrylonitrile polymer that contains an average of at least 35% by weight of acrylonitrile combined in the polymer molecules," this means herein a polymerization product (homopolymer, copolymer or graft polymer or mixtures thereof) containing in the molecules thereof an average of at least about 35% by weight of the acrylonitrile unit, which is considered to be present in the individual polymer molecule as the group

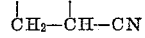

or, otherwise stated, at least about 35% by weight of the reactant substance converted into and forming the polymerization product is acrylonitrile. The expressions "an acrylonitrile polymer that contains an average of at least 50% [or at least 75%] by weight of acrylonitrile combined in the polymer molecules" have similar meanings herein.

Illustrative examples of monomers which may be copolymerized with acrylonitrile to yield a polymerization product containing acrylonitrile combined in the polymer molecules in proportions sufficient to yield a fiber-formable acrylonitrile copolymer are compounds containing a single $CH_2\!=\!C\!<$ grouping, for instance, the vinyl esters and especially the vinyl esters of saturated aliphatic monocarboxylic acids, e.g., vinyl acetate, vinyl propionate, vinyl butyrate, etc.; vinyl and vinylidene halides, e.g., the vinyl and vinylidene chlorides, bromides and fluorides; allyl-type alcohols, e.g., allyl alcohol, methallyl alcohol, ethallyl alcohol, etc.; allyl, methallyl and other unsaturated monohydric alcohol esters of monobasic acids, e.g., allyl and methallyl acetates, laurates, cyanides, etc.; acrylic and alkacrylic acids (e.g., methacrylic, ethacrylic, etc.) and esters and amides of such acids (e.g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2\!=\!C\!<$ grouping, e.g., isobutylene, etc.; and numerous other vinyl, acrylic and other compounds containing a single $CH_2\!=\!C\!<$ grouping which are copolymerizable with acrylonitrile to yield thermoplastic copolymers. Alkyl esters of alpha, beta-unsaturated polycarboxylic acids also may be copolymerized with acrylonitrile to form copolymers, e.g., the dimethyl, -ethyl, -propyl, -butyl, etc., esters of maleic, fumaric, citraconic, etc., acids.

Ordinarily, the molecular weight (average molecular weight) of the homopolymeric or copolymeric acrylonitrile, from which the polyacrylonitrile shaped articles are made, is within the range of 25,000 or 30,000 to 200,000 or 300,000 or higher, and advantageously is of the order of 50,000 to 100,000, e.g., about 70,000–80,000, as calculated from a viscosity measurement of the said polymerization product in dimethyl formamide using the Staudinger equation (reference: Houtz U.S. Patent No. 2,404,713, dated July 23, 1946).

I claim:

1. The method of producing a polyacrylonitrile filamentary material which includes the steps of stretching an unwashed, wet-spun gelled, polyacrylonitrile filamentary material, directly after removal from the coagulating bath in which it was formed, at a temperature of from about −2° C. to about 40° C. to between one and one-half and four times its original length, said gelled, polyacrylonitrile filamentary material containing water, and also an alkali-metal thiocyanate in an amount corresponding to, on net-dry basis, from one-half to twice the weight of the net-dry acrylonitrile polymer that is present in the said filamentary material; treating the thusly stretched filamentary material for the removal of thiocyanate therefrom; stretching the treated filamentary material a second time to between one and one-half and ten times its once-stretched length, the second stretch being correlated with the first stretch so that the total stretch is to from three to fifteen times the length of the said filamentary material immediately before the first stretch, said second stretch being effected while the said filamentary material is in contact with moisture and at a temperature within the range of about 70° C. to about 110° C.; and drying the twice-stretched gelled filamentary material.

2. A method as in claim 1 wherein the alkali-metal thiocyanate is sodium thiocyanate.

3. A method as in claim 1 wherein the gelled filamentary material, after being stretched for the first time, is treated for the removal of thiocyanate therefrom by washing with water.

4. A method as in claim 1 wherein the gelled filamentary material, after being stretched for the second time, is rinsed with water prior to drying.

5. A method as in claim 1 wherein the second stretch is effected while the gelled filamentary material is in contact with water at a temperature within the range of about 70° C. to about 100° C.

6. A method as in claim 1 wherein the first stretch of the gelled polyacrylonitrile filamentary material is effected in an inert gaseous medium.

7. A method as in claim 6 wherein the inert gaseous medium is air.

8. A method as in claim 1 wherein the unwashed, wet-spun, gelled, polyacrylonitrile filamentary material is one produced by extruding an aqueous solution of an acrylonitrile polymer that contains an average of at least 50% by weight of acrylonitrile combined in the polymer molecules through an orifice into a liquid coagulating bath comprising an aqueous solution containing from about 5% to about 20%, by weight, of an alkali-metal thiocyanate, thereby forming a gelled filamentary material, said coagulating bath being at a temperature not exceeding +10° C., said acrylonitrile polymer being dissolved in a concentrated aqueous solution of the same alkali-metal thiocyanate which is a component of the said liquid coagulating bath, and the concentration of the said thiocyanate in the said aqueous solution and in the said coagulating bath, the length of travel of the gelled filamentary material through the said coagulating bath and the other spinning conditions all being so correlated that the amount of residual thiocyanate in the gelled filamentary material after leaving the coagulating bath and before washing is, on a net-dry basis, from one-half to twice the weight of the net-dry acrylonitrile polymer contained in the said gelled filamentary material.

9. A method as in claim 8 wherein the alkali-metal thiocyanate is sodium thiocyanate.

10. A method as in claim 1 wherein the unwashed, wet-spun, gelled, polyacrylonitrile filamentary material is one produced by extruding an aqueous solution of an acrylonitrile polymer that contains an average of at least 75% by weight of acrylonitrile combined in the polymer molecules through an orifice into a liquid coagulating bath comprising an aqueous solution containing from about 5% to about 20%, by weight, of sodium thiocyanate, thereby forming a gelled filamentary material, said coagulating bath being at a temperature not exceeding +10° C., said acrylonitrile polymer being dissolved in a concentrated aqueous solution of sodium thiocyanate, and the concentration of the said thiocyanate in the said aqueous solution and in the said coagulating bath, the length of travel of the gelled filamentary material through the said coagulating bath and the other spinning conditions all being so correlated that the amount of residual thiocyanate in the gelled filamentary material after leaving the coagulating bath and before washing is, on a net-dry-basis, from about 1 to about 1.5 times, by weight, that of the net-dry acrylonitrile polymer contained in the said gelled filamentary material.

References Cited in the file of this patent

UNITED STATES PATENTS

| | | |
|---|---|---|
| 2,558,730 | Cresswell | July 3, 1951 |
| 2,716,586 | Terpay | Aug. 30, 1955 |
| 2,777,751 | Cresswell et al. | Jan. 15, 1957 |
| 2,790,700 | Stanton et al. | Apr. 30, 1957 |

UNITED STATES PATENT OFFICE

CERTIFICATE OF CORRECTION

Patent No. 2,948,581                                   August 9, 1960

Percival W. Cummings, Jr.

It is hereby certified that error appears in the printed specification of the above numbered patent requiring correction and that the said Letters Patent should read as corrected below.

Column 1, line 39, for "Hanseley" read -- Hansley --; column 2, line 35, for "charatceristics" read -- characteristics --; column 3, line 2, for "use" read -- used --; column 4, line 4, for "praticing" read -- practicing --; column 5, line 30, for "in" read -- is --; line 62, for "deareation" read -- deaeration --; column 6, line 23, for "90° C." read -- 98° C. --; line 26, for "lenth" read -- length --; line 67, for "1:4" read -- 1.4 --; same column 6, line 73, for "toal" read -- total --; column 8, line 46, for "-10° C." read -- -1° C. --; line 57, for "galled" read -- gelled --; column 9, line 61, for "i.g." read -- e.g. --.

Signed and sealed this 18th day of April 1961.

(SEAL)
Attest:

ERNEST W. SWIDER                                   DAVID L. LADD
Attesting Officer                                     Commissioner of Patents